(12) United States Patent
Holder

(10) Patent No.: US 6,971,725 B2
(45) Date of Patent: Dec. 6, 2005

(54) DAMPENED VEHICLE EMERGENCY BRAKE VALVE

(75) Inventor: Robert Edward Holder, Los Angeles, CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/783,496

(22) Filed: Feb. 20, 2004

(65) Prior Publication Data

US 2005/0184583 A1  Aug. 25, 2005

(51) Int. Cl.[7] .............................................. B60T 8/86
(52) U.S. Cl. ..................... 303/126; 244/111; 137/596.2
(58) Field of Search .......................... 251/50, 244–246; 137/596, 596.2; 303/126, 119.1, 119.2; 244/111

(56) References Cited

U.S. PATENT DOCUMENTS

| | | | | |
|---|---|---|---|---|
| 2,616,641 A | * | 11/1952 | Gagen | 244/111 |
| 3,504,947 A | * | 4/1970 | Valentine | 303/13 |
| 3,533,661 A | * | 10/1970 | Cruse | 303/68 |
| 3,617,097 A | * | 11/1971 | Grabb | 303/13 |
| 3,712,685 A | * | 1/1973 | Hoffman | 303/52 |
| 3,746,401 A | * | 7/1973 | Stearns | 303/71 |
| 3,778,119 A | * | 12/1973 | Kersting | 303/68 |
| 3,880,473 A | | 4/1975 | Urban et al. | |
| 4,120,540 A | * | 10/1978 | Devlieg | 303/126 |
| 4,360,239 A | * | 11/1982 | Boehringer | 303/117.1 |
| 4,714,298 A | * | 12/1987 | Mail | 303/126 |
| 4,993,781 A | * | 2/1991 | Lindahl | 303/117.1 |
| 5,044,697 A | * | 9/1991 | Longyear et al. | 303/14 |
| 5,918,627 A | * | 7/1999 | Oshiro | 251/50 |

* cited by examiner

*Primary Examiner*—Robert A. Siconolfi
(74) *Attorney, Agent, or Firm*—Marvin L. Union

(57) ABSTRACT

A valve for controlling an emergency brake system on an aircraft. The valve has separate poppets for controlling the flow of fluid from a supply line to the brake cylinders and from the brake cylinders to a tank return line. The poppets act on each other. A dampening orifice restricts fluid flow around one of the poppets thereby limiting the rate at which that poppet opens and closes. An actuator applies an externally generated control force to the poppets to activate and de-active the emergency brake system.

22 Claims, 1 Drawing Sheet

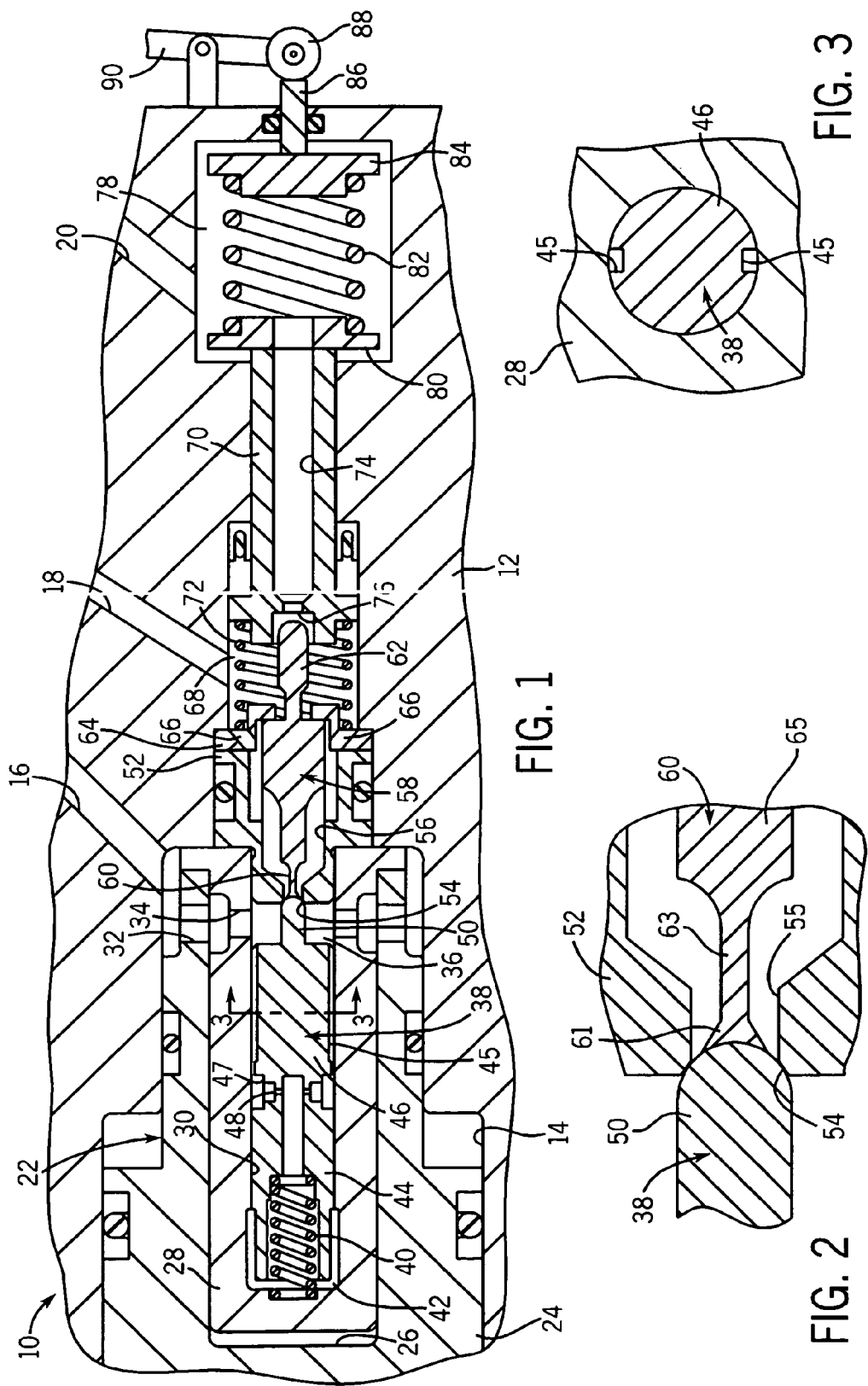

DAMPENED VEHICLE EMERGENCY BRAKE VALVE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic valves for operating an emergency brake system on a vehicle, and more particularly to such hydraulic valves for use on aircraft.

2. Description of the Related Art

Aircraft, much like other vehicles, incorporate an emergency braking system which activates the brakes for long term parking and for emergency stopping when the principal brake system fails. A lever or other activating mechanism in the cockpit is mechanically connected to a hydraulic valve which controls the flow of fluid in the aircraft's hydraulic system to and from the brake cylinders at the wheels. For long term parking, the valve is moved to a fully on position and locked there. Since the aircraft is shut down, the pumps that supply pressurized fluid in the hydraulic systems are deactivated. However, the brake system is kept energized by pressurized fluid stored in an accumulator.

Leakage through the valve is a critical parameter to maintaining the brakes activated for a prolonged period of time. In order to minimize that leakage, a low-cost solution is to employ a poppet valve and a series of check valves as the brake valve assembly. A general characteristic of a poppet valve is a relatively a high flow gain because the entire circumference of the seat is opened at once. In addition, for the proper feel of the brakes under dynamic conditions, the friction of the system must be relatively low. However, the combination of a high gain coupled with a low friction (low dampening) can lead to instability in particular systems that have inherent resonance problems.

As a consequence, it is desirable to provide a hydraulic valve for an aircraft emergency brake system that provides a higher degree of dampening for more stable operation.

SUMMARY OF THE INVENTION

A hydraulic valve is provided to control an emergency brake on a vehicle. The hydraulic valve includes a body that has a main bore into which a first passage, a second passage, and a third passage open. For example, the first passage receives pressurized fluid from a pump, the second passage communicates with brake cylinders on the vehicle, and the third passage communicates with a fluid reservoir. A first chamber and a second chamber are defined on opposites sides of a first poppet that is slidably received in the main bore. The first passage opens into the first chamber. A passageway with a dampening orifice provides a fluid path between the first and second chambers. In order for the first poppet to move, fluid has to flow through the dampening orifice. The flow is restricted by that orifice thereby limiting the rate of poppet movement.

A first valve seat has a seat aperture there through that extends between the first chamber and a third chamber in the bore. The second passage opens into the third chamber. A first spring biases the first poppet against the first valve seat. A second poppet is slidably received in the main bore on an opposite side of the first valve seat from the first poppet and has a portion projecting into the seat aperture and engaging the first poppet. A sensing piston is slidable within the main bore and has a piston aperture. A first end of the piston aperture communicates with the third chamber and a second end communicates with the third passage. A second valve seat is formed at the first end of the piston aperture and is selectively engaged by the second poppet. An actuator is operably coupled to transfer force to the sensing piston and thereby operate the hydraulic valve.

BRIEF DESCRIPTION OF THE DRAWINGS

FIG. 1 is a longitudinal cross-sectional view through a novel emergency brake valve in the off state;

FIG. 2 is an enlarged area of FIG. 1 showing details of components associated with a first valve seat; and FIG. 3 is a cross sectional view along line 3—3 in FIG. 1.

DETAILED DESCRIPTION OF THE INVENTION

With reference to FIG. 1, an emergency brake valve 10 has a body 12 with a main bore 14 having sections of different diameters. A pump supply passage 16 conveys pressurized fluid into one section of the main bore 14 and a tank return passage 20 leads from a different bore section to a tank, or reservoir, of the hydraulic system. A cylinder passage 18 extends from yet another section of the main bore 14 to the brake cylinders at the wheels of the aircraft or other vehicle.

A valve cartridge 22 is secured within the main bore 14. A valve stem 24 of that cartridge has an outer surface which engages the main bore and has a closed aperture 26 which opens into a mid-section of the main bore 14. A valve casing 28 is located within the closed aperture 26 and has a closed inner bore 30 which also opens into the mid-section of the main bore 14. The valve stem 24 and casing 28 have aligned transverse passages 32 and 34, respectively, which connect the pump supply passage 16 with a first chamber 36 created in the inner bore 30, as will be described.

A first, or supply, poppet 38 is slidably received within the inner bore 30 of the casing 28. A first spring 40 biases the supply poppet away from the closed end of the inner bore and creating a second chamber 42 at that end. The supply poppet 38 has a first section 44 with a relatively large diameter surface that abuts the inner diameter of the inner bore 30, in a manner which restricts the fluid flow there between while still allowing the supply poppet to slide within the bore. A smaller diameter section 46 of the supply poppet 38 is adjacent the first chamber 36 and fluid from that first chamber is able to enter a groove 45 in the supply poppet along the casing 28 (see also FIG. 3). A passageway 47 with a dampening orifice 48 in the supply poppet 38 provides a path for fluid to flow between the first chamber 36 and the second chamber 42. Alternatively, the passageway 47 and the dampening orifice 48 can be formed in the valve casing 28. The supply poppet 38 has a first tip 50 extending from the smaller diameter section 46 farther into the main bore 14.

A tubular member 52 has a larger diameter portion engages the interior surface of the main bore 14. A reduced diameter section of the tubular member 52 projects into the inner bore 30 of the casing 28, thereby defining the first chamber 36 with the supply poppet 38. A central aperture 56 opens through a first end of the tubular member 52 into the first chamber 36 forming a valve seat 54 at that opening. In certain states of the emergency brake valve 10, as will be described, the first tip of the supply poppet engages and closes the first valve seat 54.

A second, or return, poppet 58 is slidably received within the central aperture 56 of the tubular member 52 and has one end from which a pin 60 extends into the first valve seat 54 abutting the first tip 50 of the supply poppet 38. The return poppet 58 has a second tip 62 which projects through an aperture in a first annular retainer 64 that abuts a second end of the tubular member 52. The first retainer 64 also has a plurality of angled apertures 66 that provide fluid paths between the central aperture 56 of the tubular member 52 and a third chamber 68 of the main bore 14 into which the cylinder passage 18 opens.

The third chamber 68 also is defined by a sensing piston 70 that is slidably received within the main bore 14 and biased away from the first retainer 64 by a second spring 72. The sensing piston 70 has a generally tubular shape with a central piston aperture 74 extending there through. A first end of the piston aperture 74 opens through a second valve seat 76 into the third chamber 68. The opposite second end of the piston aperture 74 opens into a fourth chamber 78 of the main bore 14 into which the tank return passage 20 also opens. This end of the sensing piston 70 engages an annular second retainer 80 which is biased away from a third retainer 84 by a third spring 82 within the fourth chamber 78.

The exterior mechanical linkage for operating the emergency brake valve 10 acts on the third retainer 84. Specifically, an actuator 86, such as a rod, extends through an aperture in the valve body 12 which has a seal to prevent fluid leakage around the actuator. The exterior end of the actuator 86 engages a wheel 88 on one end of a input lever 90 which is pivotally connected to the valve body 12. As will be described, pivoting the input lever 90 exerts an axially force on the components of the emergency brake valve.

FIG. 1 illustrates the off state of emergency brake valve 10 in which the brakes of the aircraft are not energized and allow the wheels to move freely. In this state, the input lever 90 is unloaded and the net axially forces on the valve components place the sensing piston 70 to an extreme rightward position in the illustrated orientation of the valve. In this state, the second valve seat 76 on the sensing piston is spaced from the second poppet tip 62 opening a fluid path between the third chamber 68 and the fourth chamber 78, which allows fluid to flow from the brake cylinder passage 18 to the tank return passage 20. In this off state, the first spring 40 biases the supply poppet 38 rightward against the first valve seat 54 thereby closing communication between the pump supply passage 16 and the cylinder passage 18. As a consequence, the brake cylinders are at the low tank pressure and are deactivated.

Reference herein to directional relationships and movement, such as top and bottom or left and right, refer to the relationship and movement of the components in the orientation illustrated in the drawing, which may not be the orientation of the valve as attached to an aircraft or other vehicle.

A common requirement for an aircraft braking system is to ensure that under single failure conditions, the brakes are not partially engaged during takeoff. This is achieved configuring the pin 60 of the return poppet 58 so that even if the supply poppet tip 50 fails the engage the first valve seat 54, the flow through that valve seat is relatively low in comparison to the exhausting flow through the second valve seat 76. This flow relationship maintains the pressure in the cylinder passage 18 below a critical level at which the brakes activate. With reference to FIG. 2, the return poppet pin 60 has a shaft 63 extending from the poppet body 65 and having an enlarged head 61 at its remote end. In the illustrated off position of the emergency brake valve 10, the head 61 is in the valve seat aperture 55 which significantly reduces the size of the path through the first valve seat 54 should the supply poppet 38 fail to engage the first valve seat 54. However in another position of the emergency brake valve 10 in which fluid flows from the pump supply passage 16 to the cylinder passage 18, the pin head 61 is located leftward with respect to the tubular member 52 thereby not significantly affecting the flow through the valve seat. In this latter position, the smaller diameter shaft 63 is in the valve seat aperture 55, thereby creating a larger flow area.

In order to activate the brakes of the aircraft, pressure within the cylinder passage 18 must increase by applying pressurized fluid from the pump supply passage 16. This is achieved by manipulating the mechanical linkage so that the input lever 90 pushes the actuator 86 farther into the valve body 12. This motion is transferred to the sensing piston 70 which moves to the left and into engagement with the return poppet 58 closing the path through the second valve seat 76. Continued movement of these components causes the return poppet 58 to move leftward so that the pin 60 forces the tip 50 of the supply poppet 38 away from engagement with the first valve seat 54. This latter motion opens a path for fluid in the pump supply passage 16 to flow through the first chamber 36, the tubular member 52 and the first retainer passages 66 into the third chamber 68 and out through the cylinder passage 18. As a consequence, increased fluid pressure is applied to the brake cylinders causing them to at least partially activate, depending upon the amount of motion and force supplied by the input lever 90.

This opening motion of the supply poppet 38 deceases the size of the second chamber 42. Therefore, the fluid within that second chamber must flow to the opposite side of the supply poppet 38 and into the first chamber 36 before the poppet can move. However, the path for this fluid flow is restricted by the small size of the dampening orifice 48 thereby creating a differential pressure across the supply poppet and thus a dampening force. As a consequence, the rate at which the supply poppet 38 is able to open is dampened by this restricted flow. This dampening action slows the motion of the entire series of components within the main bore 14.

In the opened state, the bulk modulus of this fluid allows the pressure within the third valve chamber 68 to rise until that pressure exerts a force on the sensing piston 70 which balances the opposing force of the third spring 82. At that point, the second tip 62 of the return poppet 58 continues to be held against the second valve seat 76, and the pin head 61 of that poppet returns into the first valve seat aperture 55, thereby allowing the first tip 50 of the supply poppet 38 to engage the first valve seat 54 (FIG. 2). Now, the path between the pump supply passage 16 and the cylinder passage 18 is closed, which stabilizes the active brake pressure to a steady state level.

From the increased pressure state during activation of the aircraft brakes, movement of the input lever 90 in the opposite direction deceases the pressure within the cylinder passage 18 until the net axial force allows the sensing piston 70 to move to the right in FIG. 1. In other words, movement of the input lever deceases the force exerted on the third spring 82 and the force applied to the adjacent end of the sensing piston 70. Thus, the force provided by the second spring 72 and pressure within the third chamber 68 force the sensing piston 70 away from the second tip 62 on the return poppet 54, opening a path through the second valve seat 76 between the third chamber 68 and the tank return passage 20. This motion of the sensing piston 70 also removes the leftward acting force previously applied to the return poppet 58. As a consequence, the force of the first spring 40 acting the supply poppet 38 and the differential pressure across the return poppet 54 cause those poppets to move to the right until the first tip 50 of the supply poppet engages the first valve seat 54. This closes the path between the pump supply passage 16 and the cylinder passage 18. Thus, the previous relatively high pressure within the brake cylinder passage 18 now is relieved through the second valve seat 78 to the tank return passage 20.

However, the rate of rightward motion of the supply poppet 38 is limited because fluid must flow from the first chamber 36 through the dampening orifice 48 into the second chamber 42. The relatively small size of the dampening orifice 48 restricts that flow, thereby limiting the rate at which the supply poppet 38 is able to move into the closed position. However, this dampening action slows only the closure of the supply poppet 38 and does not affect motion of the other components of the emergency brake valve 10 at this time.

If the input lever 70 is not placed into the off state position, it continues to exert some force via the third spring 82. Therefore, as pressure within the emergency brake valve 10 decreases, the force of the third spring 82 produces a counteracting movement of the sensing piston 70 toward the return poppet 58. That motion continues until the second poppet tip 62 engages the second valve seat 76 thereby closing the path between the cylinder passage 18 and the tank return passage 20. At this point, the brake pressure stabilizes at a new, lower level.

However, moving the input lever 90 from a brake active state to the off state shown in FIG. 1, allows the valve components to stabilize in the illustrated position at which the supply poppet 38 engages the first valve seat 52 closing the path between the pump supply passage 16 and the cylinder passage 18. In this off state, the sensing piston 70 is biased by the second spring 72, slightly away from the tip 62 of the return poppet 58. This position creates a passage to relieve any pressure within the brake cylinder passage 18 to the tank return passage 20, thereby entirely deactivating the wheel brakes.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A hydraulic valve for controlling an emergency brake on a vehicle, the hydraulic valve comprising:
   a body having a main bore into which a first passage, a second passage, and a third passage open;
   a first poppet slidably received in the main bore and defining a first chamber and a second chamber on opposite sides of the first poppet, wherein the first passage communicates with the first chamber;
   a passageway providing a fluid path between the first and second chambers and having a dampening orifice;
   a first valve seat having a seat aperture there through that extends between the first chamber and a third chamber in the bore, wherein the second passage communicates with the third chamber;
   a first spring biasing the first poppet against the first valve seat;
   a second poppet slidably received in the main bore on an opposite side of the first valve seat from the first poppet, and having a portion projecting into the seat aperture and engaging the first poppet;
   a sensing piston slidably received in the main bore, and including a piston aperture with a first end communicating with the third chamber and with a second end communicating with the third passage, and a second valve seat formed at the first end of the piston aperture and being selectively engaged by the second poppet; and
   an actuator operably coupled to transfer force to the sensing piston and thereby operate the hydraulic valve.

2. The hydraulic valve as recited in claim 1 wherein the first passage receives pressurized fluid from a source, the second passage communicates with a brake cylinder on the vehicle, and the third passage communicates with a hydraulic system reservoir.

3. The hydraulic valve as recited in claim 1 wherein the dampening orifice restricts flow of fluid between the first and second chambers thereby limiting a rate of movement of the first poppet to less than a predefined level.

4. The hydraulic valve as recited in claim 1 wherein the dampening orifice is formed in the first poppet.

5. The hydraulic valve as recited in claim 1 further comprising a second spring tending to bias the sensing piston away from the second poppet.

6. The hydraulic valve as recited in claim 1 further comprising another spring biasing the sensing piston away from the actuator.

7. The hydraulic valve as recited in claim 1 wherein the portion of the second poppet has an element that restricts fluid flow through the seat aperture to a greater degree when the first poppet is in a first position than when the first poppet is in a second position.

8. The hydraulic valve as recited in claim 1 wherein the portion of the second poppet comprises a shaft with a head at one end, wherein the head has a larger cross-sectional area than the shaft and abuts the first poppet.

9. A hydraulic valve for controlling an emergency brake on a vehicle, the hydraulic valve comprising:
   a body having a main bore in which a first chamber, a second chamber, a third chamber and a fourth chamber are defined, the body further having a supply passage for conveying pressurized fluid from a source and opens into the first chamber, a cylinder passage for communicating with a brake cylinder on the vehicle and opening into the third chamber, and a return passage for communicating with a hydraulic system tank and opening into the fourth chamber;
   a supply poppet slidably received in the main bore between the first chamber and the second chamber, and having a dampening orifice that provides a restricted fluid flow path between the first and second chambers thereby limiting a rate of movement of the supply poppet;
   a first valve seat with a seat aperture there through and separating the first chamber and the third chamber;
   a first spring biasing the supply poppet into engagement with the first valve seat;

a return poppet slidably received in the third chamber and having a pin projecting into the seat aperture and against the supply poppet;

a sensing piston slidably received in the main bore, and having a piston aperture with a first end opening into the third chamber and with a second end opening into the fourth chamber, and a second valve seat formed at the first end of the piston aperture and selectively engaged by the return poppet;

a second spring biasing the sensing piston away from the return poppet; and an actuator operably coupled to transfer force to the sensing piston and thereby operate the hydraulic valve.

10. The hydraulic valve as recited in claim 9 further comprising a third spring biasing the sensing piston and the actuator apart.

11. The hydraulic valve as recited in claim 9 wherein the pin has an element that restricts fluid flow through the seat aperture to a greater degree when the return poppet is in a first position than when the return poppet is in a second position in the main bore.

12. The hydraulic valve as recited in claim 9 wherein the pin of the return poppet has a shaft with a head at one end, wherein the head is larger in cross-sectional area than the shaft and abuts the supply poppet.

13. A hydraulic valve for controlling an emergency brake on a vehicle, the hydraulic valve comprising:

a body having a main bore into which a first passage, a second passage and a third passage open, the first passage for conveying pressurized fluid from a source, the second passage for communicating with a brake cylinder on the vehicle, and the third passage for communicating with a hydraulic system tank;

a supply poppet slidably received in the main bore and defining a first chamber and a second chamber on opposite sides of the supply poppet, wherein the first passage opens into the first chamber;

a first valve seat with a seat aperture there through that extends between the first chamber and a third chamber defined in the bore, wherein the second passage opens into the third chamber;

a first spring biasing the supply poppet into engagement with the first valve seat;

a return poppet slidably received in the main bore on an opposite side of the first valve seat from the supply poppet, and the return poppet having poppet body from which a shaft projects into the seat aperture wherein the shaft has a head that engages the supply poppet;

a sensing piston slidably received in the main bore, and having a piston aperture with a first end communicating with the third chamber and with a second end communicating with the third passage, and a second valve seat formed at the first end of the piston aperture and being selectively engaged by the return poppet; and an actuator operably coupled to transfer force to the sensing piston and thereby operate the hydraulic valve.

14. The hydraulic valve as recited in claim 13 wherein the head on the return poppet has a larger cross-sectional area than the shaft.

15. The hydraulic valve as recited in claim 14 wherein the return poppet has a first position in which the head is in the seat aperture and a second position in which the head is outside the seat aperture.

16. The hydraulic valve as recited in claim 13 further comprising a passageway with a dampening orifice which provides a fluid path between the first and second chambers, the dampening orifice restricting flow of fluid between the first and second chambers thereby limiting a rate of movement of the supply.

17. The hydraulic valve as recited in claim 13 wherein the dampening orifice is formed in the supply poppet.

18. The hydraulic valve as recited in claim 13 further comprising a second spring biasing the sensing piston away from the return poppet.

19. The hydraulic valve as recited in claim 13 further comprising another spring biasing the sensing piston and the actuator apart.

20. The hydraulic valve as recited in claim 1 wherein the first poppet is separate from and able to slide within the main bore independently of the second poppet.

21. The hydraulic valve as recited in claim 9 wherein the supply poppet is separate from and able to slide within the main bore independently of the return poppet.

22. The hydraulic valve as recited in claim 17 wherein the supply poppet is separate from and able to slide within the main bore independently of the return poppet.

* * * * *